United States Patent
Lim et al.

(10) Patent No.: US 10,477,134 B2
(45) Date of Patent: Nov. 12, 2019

(54) IMAGE DISPLAY DEVICE AND OPERATING METHOD FOR THE SAME

(71) Applicant: SAMSUNG ELECTRONICS CO., LTD., Suwon-si (KR)

(72) Inventors: Chae-young Lim, Bucheon-si (KR); Je-hwan Seo, Suseong-gu (KR); Min-sup Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 15/840,728

(22) Filed: Dec. 13, 2017

(65) Prior Publication Data
US 2018/0199001 A1   Jul. 12, 2018

(30) Foreign Application Priority Data
Jan. 11, 2017   (KR) .................... 10-2017-0004170

(51) Int. Cl.
*H04N 5/44* (2011.01)
*G06F 3/03* (2006.01)
(Continued)

(52) U.S. Cl.
CPC ......... *H04N 5/4403* (2013.01); *G06F 3/0312* (2013.01); *H04N 21/4104* (2013.01);
(Continued)

(58) Field of Classification Search
CPC .... H04N 5/44; H04N 5/4403; H04N 21/4104; H04N 5/23203; G06F 3/0312; G06F 3/0362; G06F 3/0488
(Continued)

(56) References Cited

U.S. PATENT DOCUMENTS

| | | | |
|---|---|---|---|
| 7,610,555 B2 * | 10/2009 | Klein | G06F 3/0481 341/176 |
| 8,760,587 B2 * | 6/2014 | Tian | H04N 5/4403 348/734 |

(Continued)

FOREIGN PATENT DOCUMENTS

| | | |
|---|---|---|
| EP | 2 536 164 A1 | 12/2012 |
| JP | 2006-211125 A | 8/2006 |

OTHER PUBLICATIONS

Communication dated Apr. 18, 2018 by the European Patent Office in counterpart European Patent Application No. 17206893.4.
(Continued)

*Primary Examiner* — Trang U Tran
(74) *Attorney, Agent, or Firm* — Sughrue Mion, PLLC

(57) ABSTRACT

An image display apparatus and a method of operating the same are provided. The image display apparatus includes a display configured to display a screen, and a communicator configured to communicate with a control device. The image display apparatus further includes a processor configured to control the communicator to transmit an activation signal to the control device, in response to the image display apparatus being in a pre-set state, control the communicator to receive a control signal corresponding to a wheel key input that is sensed by the control device in response to the activation signal being transmitted, and control an operation of the image display apparatus, according to an interaction that is determined based on the control signal that is received and state information of the screen.

18 Claims, 13 Drawing Sheets

(51) Int. Cl.
 *H04N 21/41* (2011.01)
 *G06F 3/0362* (2013.01)
 *G06F 3/0488* (2013.01)
 *H04N 5/232* (2006.01)

(52) U.S. Cl.
 CPC .......... *G06F 3/0362* (2013.01); *G06F 3/0488* (2013.01); *H04N 5/23203* (2013.01)

(58) Field of Classification Search
 USPC ................................ 348/734, 725, 563–564
 See application file for complete search history.

(56) References Cited

U.S. PATENT DOCUMENTS

| | | | |
|---|---|---|---|
| 9,612,733 B2* | 4/2017 | Kim | ................. H04N 21/42204 |
| 2013/0286293 A1 | 10/2013 | Katsuyama | |
| 2013/0335767 A1* | 12/2013 | Ha | ..................... G03G 15/5016 358/1.13 |
| 2014/0267931 A1 | 9/2014 | Gilson et al. | |
| 2016/0255733 A1 | 9/2016 | Jung et al. | |

OTHER PUBLICATIONS

Communication dated Nov. 20, 2018, issued by the European Patent Office in counterpart European Application No. 17206893.4.

* cited by examiner

FIG. 1
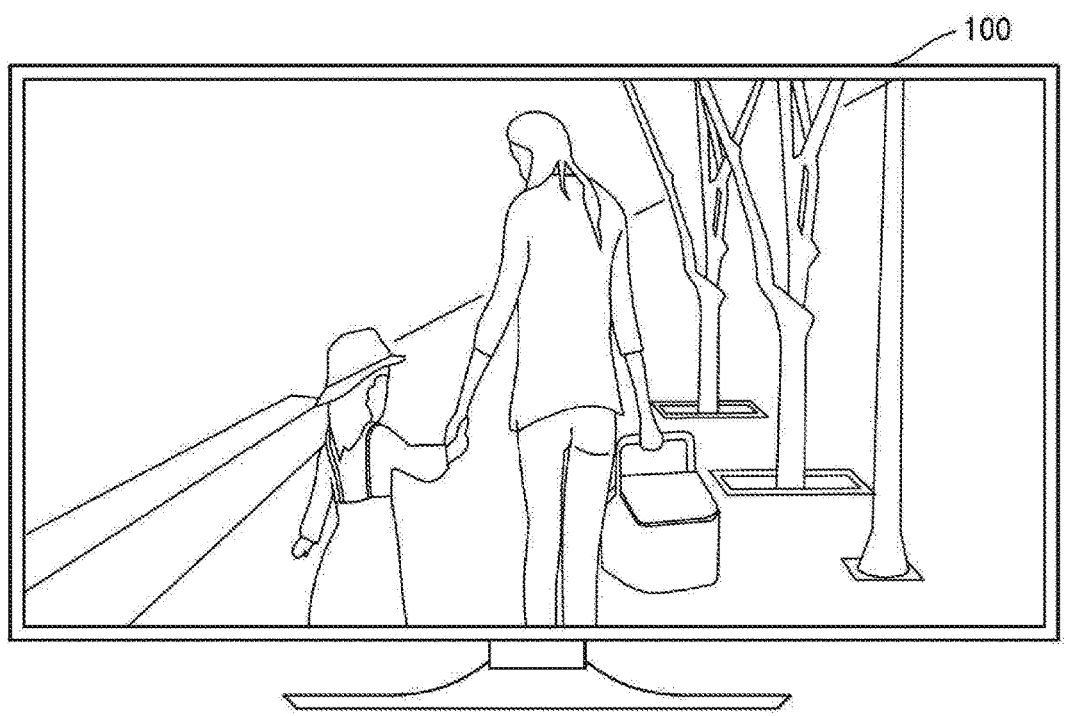
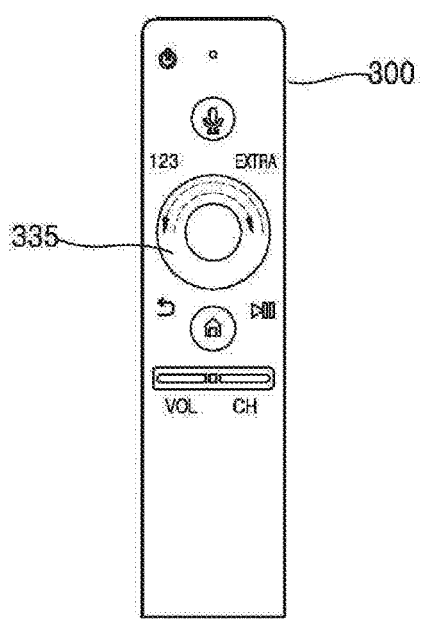

FIG. 5
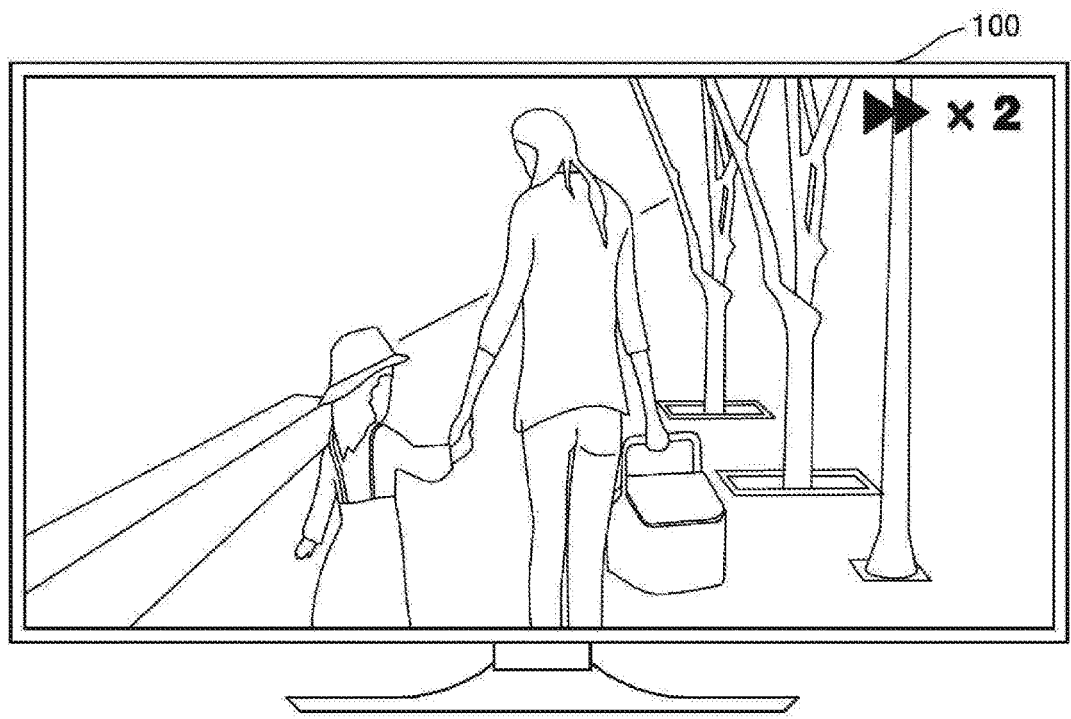
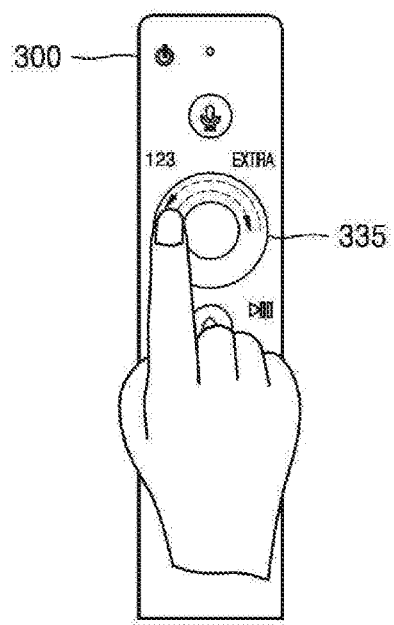

FIG. 6
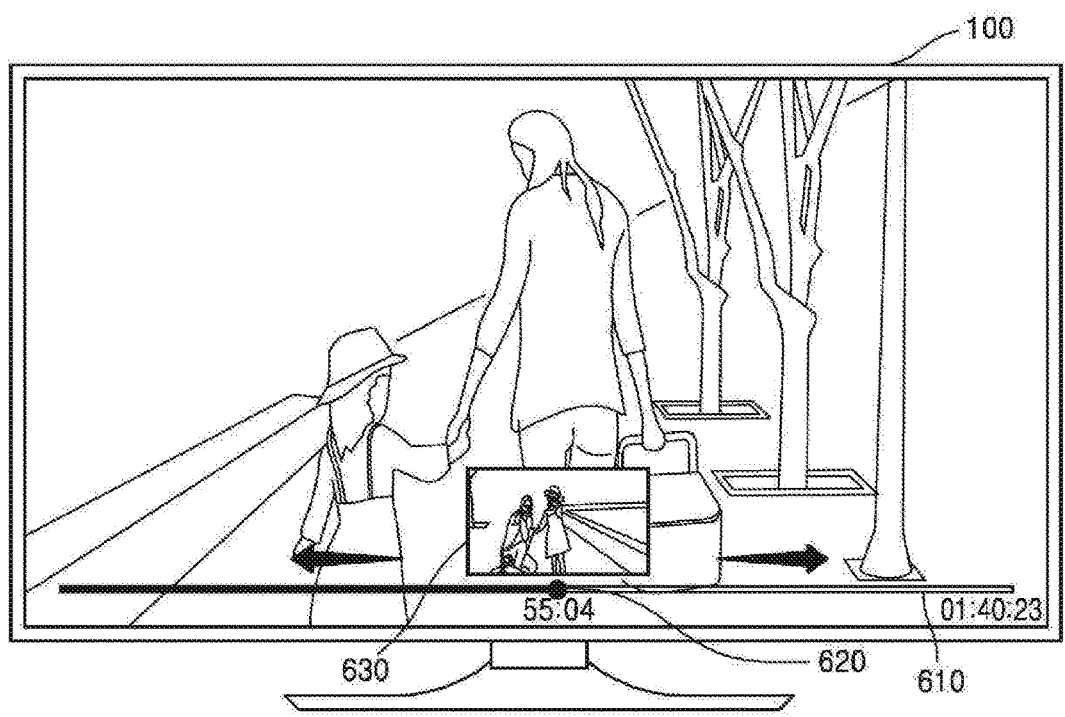
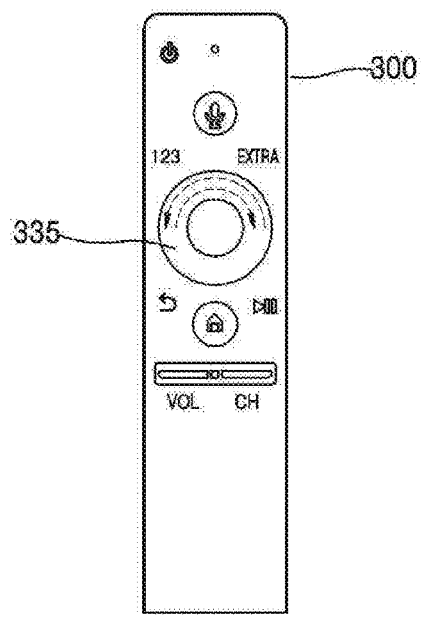

FIG. 7
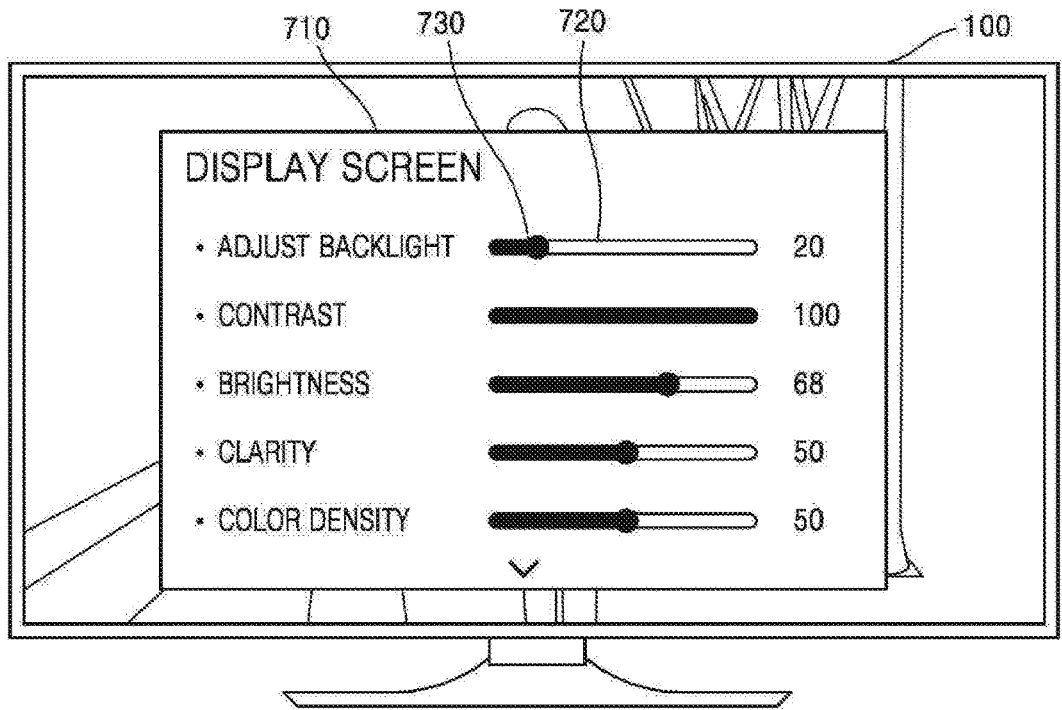
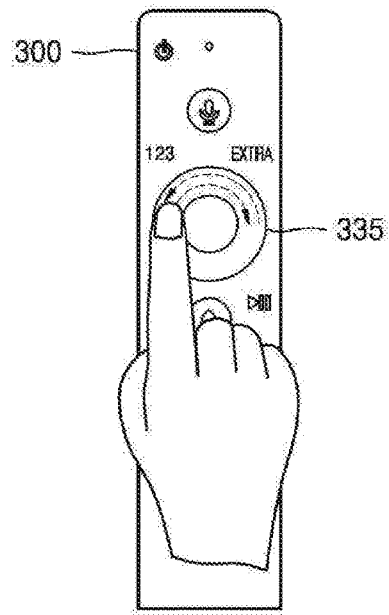

FIG. 8
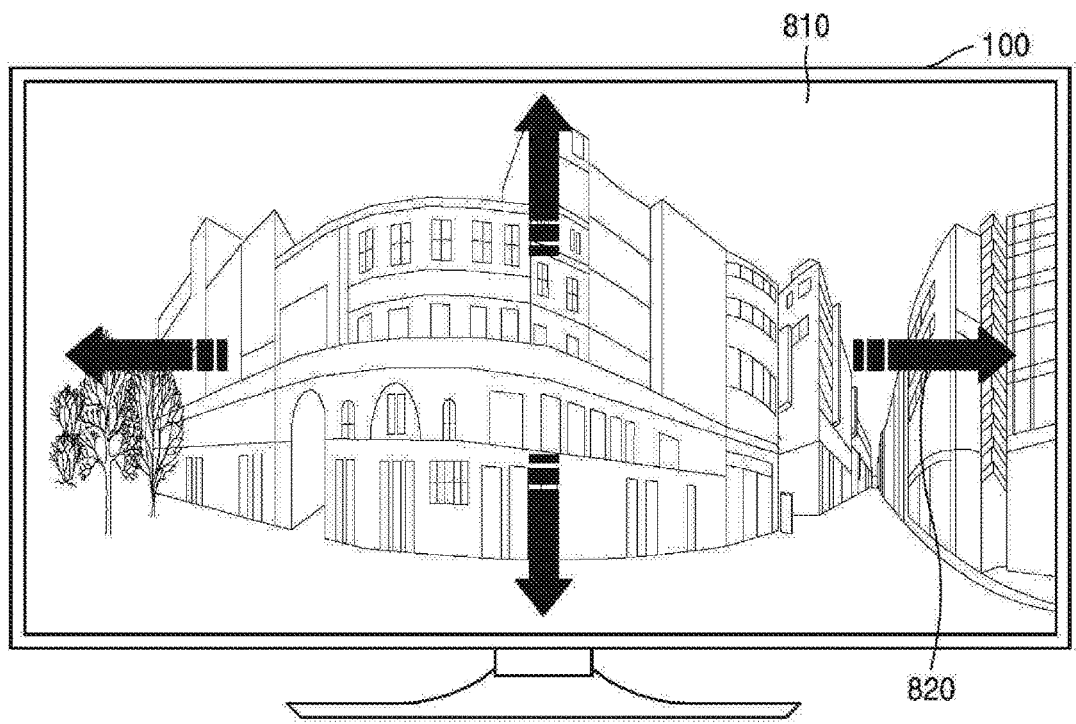
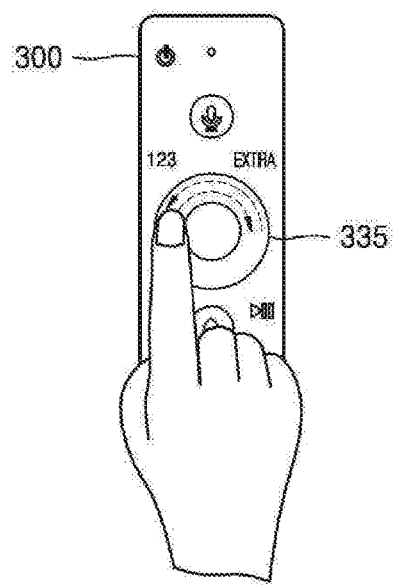

FIG. 9
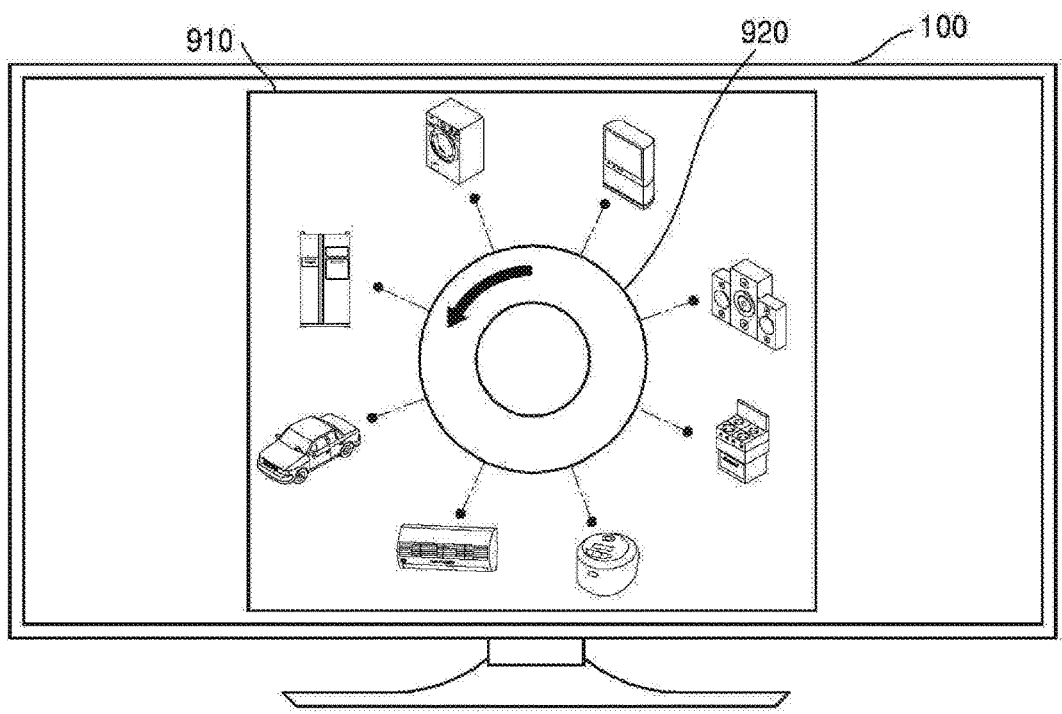
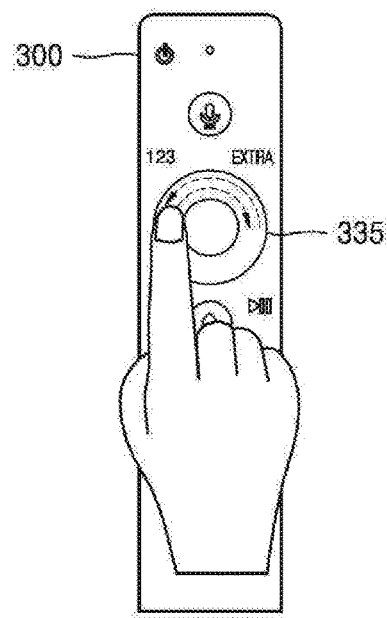

IMAGE DISPLAY DEVICE AND OPERATING METHOD FOR THE SAME

CROSS-REFERENCE TO RELATED APPLICATION

This application claims priority from Korean Patent Application No. 10-2017-0004170, filed on Jan. 11, 2017, in the Korean Intellectual Property Office, the disclosure of which is incorporated herein by reference in its entirety.

BACKGROUND

1. Field

Methods and apparatuses consistent with example embodiments relate to an image display apparatus and a method of operating the same, and more particularly, to an image display apparatus whose operations may be controlled based on wheel-type control operations and a method of operating the same.

2. Description of the Related Art

An image display apparatus is a device having a function of displaying an image that a user may view. A user may view a broadcast via an image display apparatus. An image display apparatus displays an image based on a broadcast signal selected by a user from broadcast signals transmitted from a broadcasting station on a display.

Furthermore, a smart television (TV), which has functions to provide various additional contents, is available. A smart TV aims to analyze and provide what a user desires without any manipulation by the user instead of being manually operated according to a user's selection.

Also, when performing fast-forward/rewind operations, a user of an image display apparatus may have to repeatedly input a key (e.g., left/right directional keys) to adjust a speed of the fast-forward/rewind operations, and an operation not intended by the user may be performed due to an error of key input.

SUMMARY

According to an aspect of an example embodiment, there is provided an image display apparatus including a display configured to display a screen, a communicator configured to communicate with a control device, and a processor configured to control the communicator to transmit an activation signal to the control device, in response to the image display apparatus being in a pre-set state, control the communicator to receive a control signal corresponding to a wheel key input that is sensed by the control device in response to the activation signal being transmitted, and control an operation of the image display apparatus, according to an interaction that is determined based on the control signal that is received and state information of the screen.

The pre-set state may include a state in which the image display apparatus is controllable by the wheel key input.

The processor may be further configured to control the display to change the screen, based on the interaction that is determined.

The processor may be further configured to determine whether the image display apparatus is in the pre-set state, based on information of a source apparatus connected to the image display apparatus.

The processor may be further configured to detect depth information of the screen, and determine whether the image display apparatus is in the pre-set state, based on the depth information.

The processor may be further configured to, in response to the screen including an object controllable by the wheel key input, determine that the image display apparatus is in the pre-set state.

The control signal may include information of any one or any combination of a rotation direction, a rotation angle, and a number of rotations of the wheel key input sensed by the control device.

The processor may be further configured to determine the interaction, based on the information of any one or any combination of the rotation direction, the rotation angle, and the number of rotations of the wheel key input sensed by the control device.

The processor may be further configured to, in response to the screen including a video being reproduced by the image display apparatus, fast-forward or rewind the video, based on the rotation direction of the wheel key input sensed by the control device, and control a speed for fast-forwarding or rewinding the video, based on the rotation angle or the number of rotations of the wheel key input sensed by the control device.

The processor may be further configured to, in response to the screen including a slider bar allowing a cursor to move on the slider bar, move the cursor on the slider bar in a first direction or a second direction, based on the rotation direction of the wheel key input sensed by the control device.

According to an aspect of an example embodiment, there is provided a method of operating an image display apparatus, the method including transmitting an activation signal to a control device, in response to the image display apparatus being in a pre-set state, receiving a control signal corresponding to a wheel key input that is sensed by the control device in response to the activation signal being transmitted, and controlling an operation of the image display apparatus, according to an interaction that is determined based on the control signal that is received and state information of a screen that is displayed on a display.

The pre-set state may include a state in which the image display apparatus is controllable by the wheel key input.

The controlling of the operation of the image display apparatus may include changing the screen, based on the interaction that is determined.

The method may further include determining whether the image display apparatus is in the pre-set state, based on information of a source apparatus connected to the image display apparatus.

The method may further include detecting depth information of the screen, and determining whether the image display apparatus is in the pre-set state, based on the depth information.

The method may further include, in response to the screen including an object controllable by the wheel key input, determining that the image display apparatus is in the pre-set state.

The control signal may include information of any one or any combination of a rotation direction, a rotation angle, and a number of rotations of the wheel key input sensed by the control device.

The method may further include determining the interaction, based on the information of any one or any combination of the rotation direction, the rotation angle, and the number of rotations of the wheel key input sensed by the control device.

The controlling of the operation of the image display apparatus may include, in response to the screen including a video being reproduced by the image display apparatus, fast-forwarding or rewinding the video, based on the rotation direction of the wheel key input sensed by the control device, and controlling a speed for fast-forwarding or rewinding the video, based on the rotation angle or the number of rotations of the wheel key input sensed by the control device.

A non-transitory computer-readable storage medium may store instructions to cause a processor to perform the method.

BRIEF DESCRIPTION OF THE DRAWINGS

The above and/or other aspects will become apparent and more readily appreciated from the following description of example embodiments, taken in conjunction with the accompanying drawings in which:

FIG. 1 is a diagram showing an image display apparatus and a control device, according to an example embodiment;

FIG. 5 is a diagram for describing a method by which an image display apparatus controls playback of a video, based on a wheel key input, according to an example embodiment;

FIG. 6 is a diagram for describing a method by which an image display apparatus searches for a scene, based on a wheel key input, according to an example embodiment;

FIG. 7 is a diagram for describing a method by which an image display apparatus controls an operation of a slider bar, based on a wheel key input, according to an example embodiment;

FIG. 8 is a diagram for describing a method by which an image display apparatus controls a 360-degree image, based on a wheel key input, according to an example embodiment;

FIG. 9 is a diagram for describing a method by which an image display apparatus selects an Internet of Things (IoT) device to be controlled, based on a wheel key input, according to an example embodiment;

DETAILED DESCRIPTION

Figure 2:
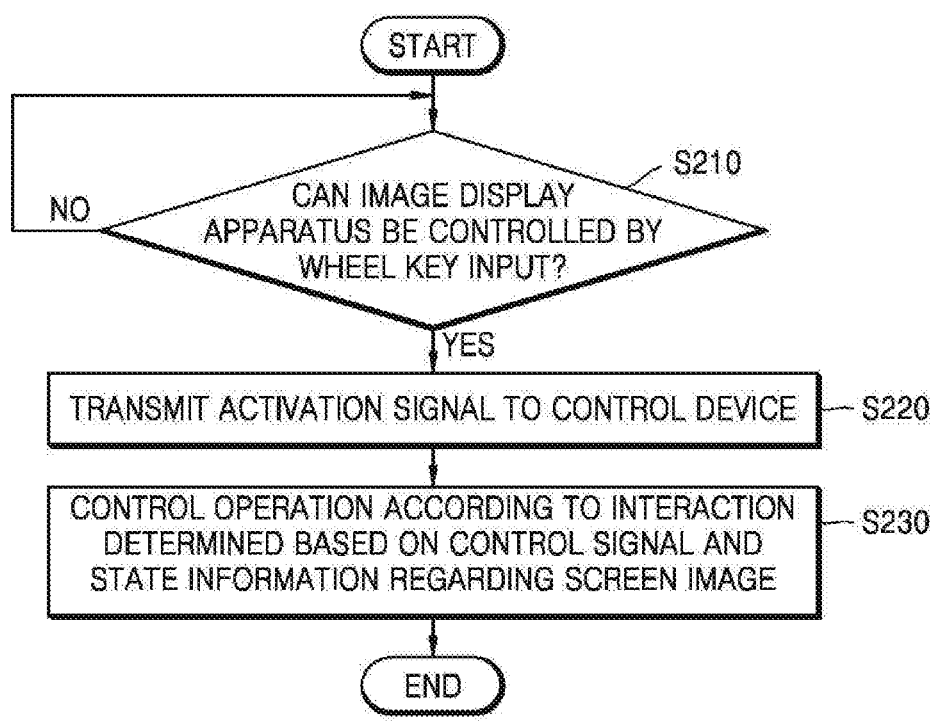
FIG. 2 is a flowchart of a method of operating an image display apparatus, according to an example embodiment.

Reference will now be made in detail to example embodiments, aspects of which are illustrated in the accompanying drawings, wherein like reference numerals refer to like elements throughout. In this regard, example embodiments may have different forms and may not be construed as being limited to the descriptions set forth herein. Therefore, the example embodiments are described below, by referring to the figures, to explain aspects. Expressions such as "at least one of," when preceding a list of elements, modify the entire list of elements and do not modify the individual elements of the list.

The terms used in the present specification will be briefly described, and the present disclosure will be described in detail.

With respect to the terms in the example embodiments of the present disclosure, the general terms that are currently and widely used are selected in consideration of functions of structural elements in the example embodiments of the present disclosure. However, meanings of the terms may be changed according to intention, a judicial precedent, appearance of a new technology, and the like. In addition, in cases, a term that is not commonly used may be selected. In such a case, the meaning of the term will be described in detail at the corresponding part in the description of the present disclosure. Therefore, the terms used in the example embodiments of the present disclosure may be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er," "or" and "module" described in the specification mean units for processing at least one function and operation and can be implemented by hardware components or software components and combinations thereof.

Hereinafter, example embodiments will be described more fully with reference to the accompanying drawings. This example embodiments may, however, be embodied in many different forms and may not be construed as limited to the example embodiments set forth herein. Rather, the example embodiments are provided so that this disclosure will be thorough and complete, and will fully convey the scope of the inventive concept to those of ordinary skill in the art. In drawings, some elements are omitted for clarity, and like elements denote like reference numerals throughout the specification.

FIG. 1 is a diagram showing an image display apparatus and a control device, according to an example embodiment.

An image display apparatus 100 according to an example embodiment may be a television (TV). However, it is an example, and the image display apparatus 100 may be embodied as an electronic device capable of receiving a broadcast signal and displaying an image based on the broadcast signal. For example, the image display apparatus 100 may be a mobile phone, a tablet PC, a digital camera, a camcorder, a laptop computer, a desktop computer, an e-book terminal, a digital broadcast terminal, a personal digital assistant (PDA), a portable multimedia player (PMP), a navigation device, an MP3 player, a wearable device, etc. Example embodiments may be easily implemented in a display device having a large display like a TV, but the present disclosure is not limited thereto.

The image display apparatus 100 may be a stationary type or a mobile type and may be a digital broadcasting receiver capable of receiving digital broadcast. Furthermore, the image display apparatus 100 may be implemented not only as a flat display device, but also as a curved display device having a display with a curvature or a flexible display device capable of adjusting a curvature. Output resolution of the image display apparatus 100 may include, for example, high definition (HD), full HD, ultra HD, or a resolution clearer than ultra HD.

A control device 300 may be implemented as various types of devices for controlling the image display apparatus 100, such as a remote control or a mobile phone. Furthermore, the control device 300 may control the image display apparatus 100 via a short-range communication including infrared ray communication or Bluetooth. The control device 300 may control functions of the image display apparatus 100 by using any one or any combination of a key (including a hard key button, a soft key, a wheel key, etc.), a touch pad, a microphone capable of receiving a user's voice, and a sensor capable of recognizing a motion of the control device 300.

According to example embodiments of the present disclosure, the term "user" refers to a person who controls functions or operations of the image display apparatus 100 by using the control device 300 and may include a viewer, an administrator, or an installation engineer.

The control device 300 according to an example embodiment may include a wheel key 335. The wheel key 335 may be configured to have a ring-like shape as shown in FIG. 1 and may be configured to receive an input rotating clockwise or counterclockwise. For example, the wheel key 335 may be implemented to receive an input that rotates the wheel key 335 itself. Alternatively, the wheel key 335 may be implemented as a touch pad and may receive an input that is dragged clockwise or counterclockwise while the wheel key 335 is being touched. However, the present disclosure is not limited thereto.

The image display apparatus 100 according to an example embodiment may transmit an activation signal to the control device 300 when the image display apparatus 100 may be controlled by a wheel key input. For example, the image display apparatus 100 may determine whether the image display apparatus 100 may be controlled by a wheel key input, based on a signal received from a connected source apparatus. Alternatively, based on a video signal corresponding to a screen image displayed on a display, it may be determined whether the image display apparatus 100 may be controlled by a wheel key input.

At this time, a state in which the image display apparatus 100 may be controlled by a wheel key input refers to a state in which a function or an operation of the image display apparatus 100 may be controlled based on a control signal corresponding to a wheel key input received from the control device 300.

When a wheel key input 335 is detected, the control device 300 according to an example embodiment may sense values regarding a rotation direction, the number of rotations, and a rotation angle corresponding to the wheel key input. When an activation signal is received from the image display apparatus 100, the control device 300 may transmit a control signal corresponding to the sensed values corresponding to the wheel key input to the image display apparatus 100.

Alternatively, the control device 300 may sense values of a rotation direction, the number of rotations, and a rotation angle corresponding to a sensed wheel key input only when an activation signal is received and transmit a control signal corresponding to the sensed values to the image display apparatus 100.

The image display apparatus 100 may determine a user interaction based on a control signal received from the control device 300 and state information regarding a displayed screen image and control an operation of the image display apparatus according to the determined user interaction. For example, the image display apparatus 100 may select a menu or change a playback speed of a video being played back in the image display apparatus on a screen image displayed on the display, based on a control signal corresponding to a wheel key input. Alternatively, based on a control signal corresponding to a wheel key input, the image display apparatus 100 may change an orientation of a 360-degree image displayed on the display. However, the present disclosure is not limited thereto.

Detailed descriptions thereof will be given below with reference to FIGS. 5 through 11.

FIG. 2 is a flowchart of a method of operating an image display apparatus, according to an example embodiment.

Referring to FIG. 2, the image display apparatus 100 may determine whether the image display apparatus 100 is in a pre-set state (operation S210). When the image display apparatus 100 is in the pre-set state, the image display apparatus 100 may transmit an activation signal to the control device 300 (operation S220).

For example, the pre-set state may include a state in which the image display apparatus 100 may be controlled by a wheel key input regarding a wheel key included in the control device 300. The image display apparatus 100 may determine whether the image display apparatus may be controlled by a wheel key input regarding a wheel key included in the control device 300 based on a video signal and a control signal received from a source apparatus connected to the image display apparatus 100. Alternatively, the image display apparatus 100 may determine whether the image display apparatus may be controlled by a wheel key input regarding a wheel key included in the control device 300, based on a video signal corresponding to a screen image displayed on a display. Alternatively, based on source device information received from a source device connected to the image display apparatus, it may be determined whether a function provided by the source device may be controlled by a wheel key input. Alternatively, based on depth information regarding a screen image displayed on the image display apparatus 100, it may be determined whether a current screen image may be controlled by a wheel key input. At this time, the depth information of the screen may be a history of key input signals received from the control device 300. However, the present disclosure is not limited thereto.

The image display apparatus 100 according to an example embodiment may transmit an activation signal to the control device 300 via a short-range communication including infrared ray communication or Bluetooth.

When an activation signal is received, the control device 300 may transmit a control signal corresponding to a sensed wheel key input to the image display apparatus 100.

The image display apparatus 100 may receive a control signal corresponding to a wheel key input from the control device 300. The image display apparatus 100 may control an operation or a function of the image display apparatus 100 according to an interaction determined based on the received control signal and state information regarding a screen image displayed on a display (operation S230).

For example, when a screen image displayed on a display includes a slide bar that may be moved by a cursor in horizontal directions and a control signal received from the control device 300 is a control signal corresponding to an input that rotates a wheel key clockwise, the image display apparatus 100 may move the cursor on the slide bar to the right based on the control signal. Alternatively, when a screen image including a video being played back is displayed on the display and a control signal received from the control device 300 is a control signal corresponding to an input that rotates the wheel key twice counterclockwise, the image display apparatus 100 may perform an operation for rewinding the video being played back at double speed.

However, the present disclosure is not limited thereto, and the image display apparatus 100 according to an example embodiment may determine various interactions appropriate to a current situation based on a received control signal and state information regarding a screen image and control an operation of the image display apparatus 100.

Figure 3:
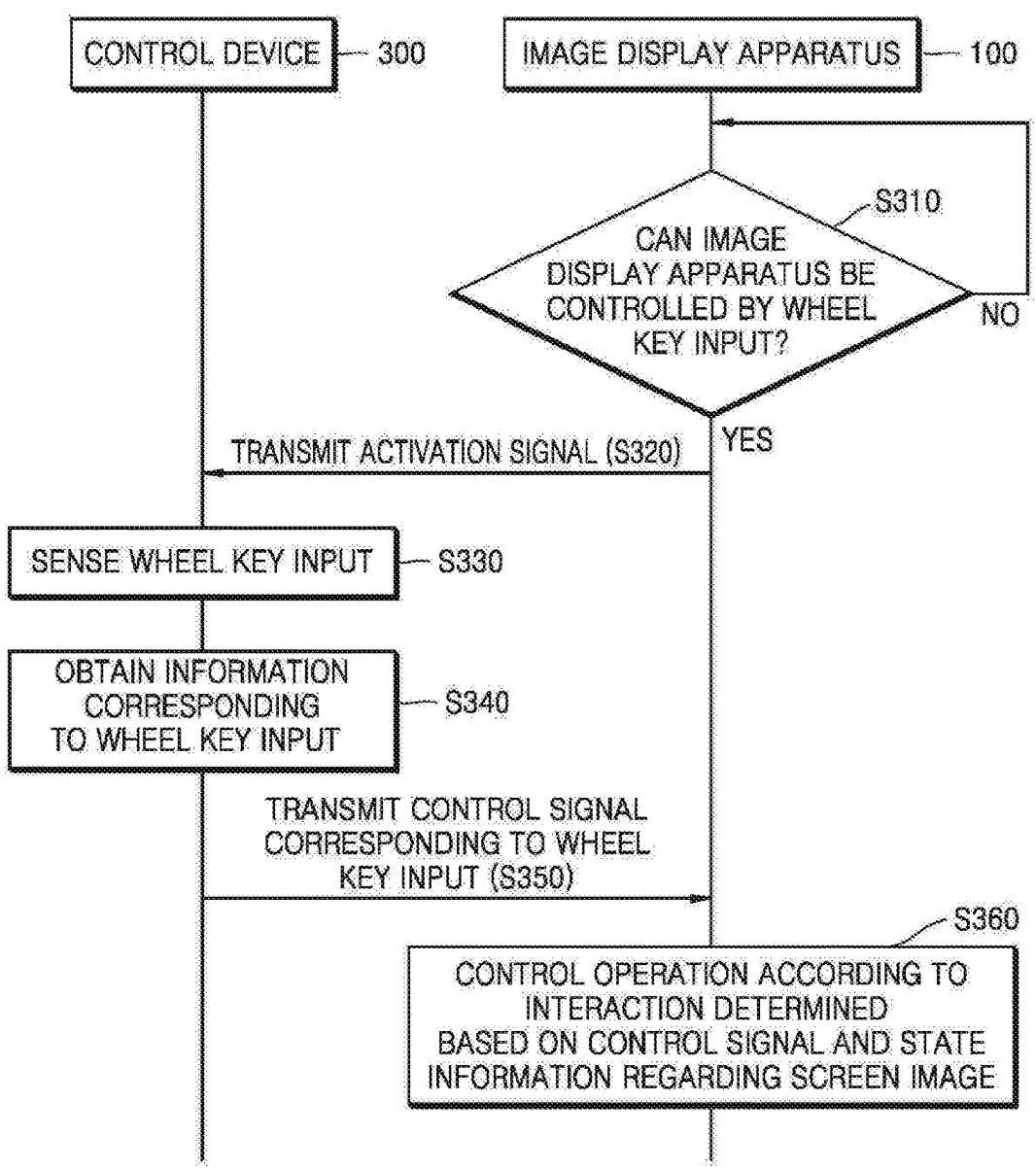
FIG. 3 is a flowchart showing a method of operating a control device and an image display apparatus, according to an example embodiment.

FIG. 3 is a flowchart showing a method of operating a control device and an image display apparatus, according to an example embodiment.

Referring to FIG. 3, the image display apparatus 100 according to an example embodiment determines whether the image display apparatus 100 may be controlled by a wheel key input (operation S310) and, when it is determined that the image display apparatus 100 may be controlled by a wheel key input, may transmit an activation signal to the control device 300 (operation S320).

Because the operation S310 and the operation S320 respectively correspond to the operation S210 and the operation S220 of FIG. 2, detailed description thereof will be omitted.

In response to the activation signal, the control device 300 according to an example embodiment may detect a wheel key input (operation S330). The control device 300 may include a wheel key and may receive an input that rotates the wheel key clockwise or counterclockwise or an input that is dragged clockwise or counterclockwise while the wheel key is being touched. However, the present disclosure is not limited thereto.

The control device 300 may obtain information corresponding to the wheel key input (operation S340). For example, the control device 300 may sense values regarding a rotation direction, the number of rotations, and a rotation angle corresponding to the wheel key input.

Referring to FIG. 3, the control device 300 may sense information corresponding to a wheel key input only for a wheel key input received after an activation signal is received from the image display apparatus 100 and may not sense information corresponding to a wheel key input for a wheel key input received before an activation signal is received.

Furthermore, the control device 300 according to an example embodiment may sense information corresponding to a wheel key input only for a wheel key input received within a pre-set time range from a time point at which an activation signal is received.

However, the present disclosure is not limited thereto, and, independently from reception of an activation signal, the control device 300 may sense information corresponding to a wheel key input every time a wheel key input is received.

In response to the activation signal, the control device 300 according to an example embodiment may transmit a control signal corresponding to the wheel key input to the image display apparatus 100 (operation S350).

At this time, the control signal corresponding to the wheel key input may include information corresponding to the wheel key input. For example, the control signal corresponding to the wheel key input may include information regarding a rotation direction, the number of rotations, and a rotation angle corresponding to the wheel key input The image display apparatus 100 may control an operation of the image display apparatus 100 according to an interaction determined based on the control signal received from the control device 300 and state information regarding a displayed screen image (operation S360).

The operation S360 of FIG. 3 corresponds to the operation S230 of FIG. 2, and thus detailed description thereof will be omitted.

Figure 4:
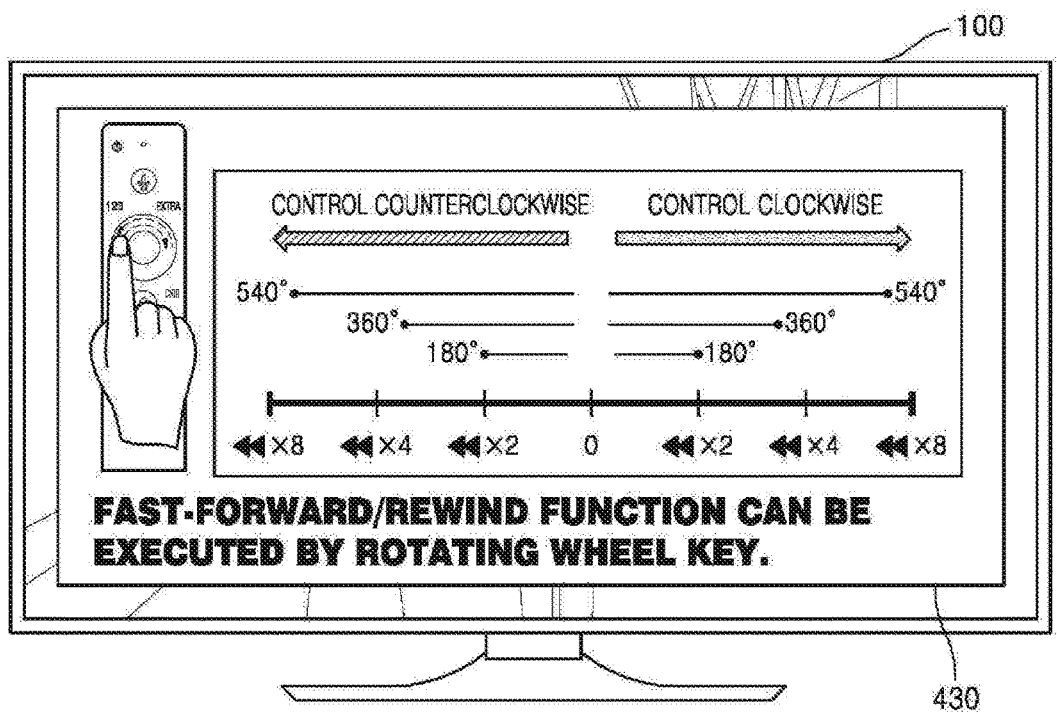
FIG. 4 is a diagram showing an example of a screen image displayed on an image display apparatus, according to an example embodiment.

FIG. 4 is a diagram showing an example of a screen image displayed on an image display apparatus, according to an example embodiment.

Referring to FIG. 4, when the image display apparatus 100 according to an example embodiment may be controlled by a wheel key input, the image display apparatus 100 may display a guide message indicating that a wheel key of the control device 300 may be used.

For example, when video content is being played back, the image display apparatus 100 may determine that the image display apparatus 100 may be controlled by a wheel key input.

The image display apparatus 100 may display a guide message 430 indicating that a video may be fast-forwarded or rewound by a wheel key input together with a video content playback screen image. At this time, the guide message 430 may indicate that the video fast forward/rewind operations may be performed at different speeds according to rotation directions and rotation angels of a wheel key input. However, the present disclosure is not limited thereto, and the image display apparatus 100 may display a guide message in various ways.

FIG. 5 is a diagram for describing a method by which an image display apparatus controls playback of a video, based on a wheel key input, according to an example embodiment.

Referring to FIG. 5, the image display apparatus 100 according to an example embodiment may play back a pre-stored video or may play back a video received from an external apparatus. For example, the image display apparatus 100 may process video data received from a source apparatus connected to the image display apparatus 100 and play back the video.

The image display apparatus 100 may display a video screen image being played back on a display. Furthermore, the image display apparatus 100 may receive information regarding an external device (e.g., a source device connected to the image display apparatus 100) and may recognize an operation or function provided by the external device based on the information regarding the external device. The image display apparatus 100 may determine whether the operation or function provided by the external device may be controlled by a wheel key input and, when the operation or function provided by the external device may be controlled by a wheel key input, may transmit an activation signal to the control device 300.

For example, the image display apparatus 100 may recognize that a video may be fast-forwarded or rewound while a video is being played back and fast-forwarding or rewinding of the video may be controlled based on an input of the wheel key 335 included in the control device 300. When a function or operation of the image display apparatus 100 may be controlled by a wheel key input, the image display apparatus 100 may display a guide message indicating an operation or function that may be executed by a wheel key input to a user as described above with reference to FIG. 4. However, the present disclosure is not limited thereto.

The image display apparatus 100 according to an example embodiment may receive a control signal corresponding to a wheel key input from the control device 300. At this time, the control signal may include information regarding a rotation direction, the number of rotations, and a rotation angle corresponding to the wheel key input.

The image display apparatus 100 may fast-forward or rewind a video based on a received control signal. For example, when the image display apparatus 100 receives a control signal corresponding to an input that rotates the wheel key 335 clockwise by 180 degrees, the image display apparatus 100 may control to fast-forward a video being played back at double speed. Alternatively, when the image display apparatus 100 receives a control signal corresponding to an input that rotates the wheel key 335 counterclockwise by 360-degrees, the image display apparatus 100 may control to rewind the video being played back at quadruple speed. Alternatively, the image display apparatus 100 may determine fast-forwarding/rewinding speeds according to the number of rotations of a wheel key as well as a rotation angle of the wheel key. However, the present disclosure is not limited thereto.

FIG. 6 is a diagram for describing a method by which an image display apparatus searches for a scene, based on a wheel key input, according to an example embodiment.

Referring to FIG. 6, the image display apparatus 100 according to an example embodiment may provide a function for searching scenes included in video content.

For example, the image display apparatus 100 may display a playback screen image regarding video content and may display a time control bar 610 for adjusting playback time point of the video content. At this time, the total length of the time control bar 610 corresponds to the total playback time of the video content, and the image display apparatus 100 may display the total playback time (e.g., 01:40:23) of the video content being played back together with the control bar 610.

Furthermore, the time control bar 610 may include a cursor 620, and the cursor 620 may be moved horizontally on the time control bar 610. As video content is played back, the cursor 620 may be moved on the time control bar 610, and a point at which the cursor 620 is located may indicate a time point corresponding to a currently played-back scene (image frame) in a total playback time.

The image display apparatus 100 may also receive an input that moves the cursor 620 on the time control bar 610. As the cursor 620 moves, the image display apparatus 100 may display a scene 630 corresponding to a point at which the cursor 620 is located in a thumbnail form. Therefore, a user may search for scenes included in video content by moving the cursor 620 on the time control bar 610.

At this time, an operation for moving the cursor 620 horizontally on the time control bar 610 may be controlled by a wheel key input. The image display apparatus 100 may transmit an activation signal to the control device 300 when entering a scene searching mode or when the cursor 620 and the time control bar 610 are displayed as shown in FIG. 6.

In response to an activation signal, the control device 300 may transmit a control signal corresponding to a wheel key input sensed by the control device 300 to the image display apparatus 100. At this time, the control signal may include information regarding a rotation direction, the number of rotations, and a rotation angle corresponding to the wheel key input.

The image display apparatus 100 may search for scenes included in video content based on a received control signal. For example, when the image display apparatus 100 receives a control signal corresponding to an input that rotates a wheel key clockwise by a first angle, the image display apparatus 100 may move the cursor 620 on the time control bar 610 to the right by a first distance. Alternatively, when the image display apparatus 100 receives a control signal corresponding to an input that rotates the wheel key counterclockwise by a second angle, the image display apparatus 100 may move the cursor 620 on the time control bar 610 to the left by a second distance. At this time, a moving distance of the cursor 620 may be proportional to a rotation angle of the wheel key.

When the cursor 620 moves on the time control bar 610 corresponding to a wheel key input, the image display apparatus 100 may display the scene 630 corresponding to a point to which the cursor 620 has moved.

FIG. 7 is a diagram for describing a method by which an image display apparatus controls an operation of a slider bar, based on a wheel key input, according to an example embodiment.

Referring to FIG. 7, the image display apparatus 100 according to an example embodiment may display a menu screen image 710 for setting a display screen of the image display apparatus 100. For example, the menu screen image 710 may include setting items, such as a screen mode setting item, a backlight setting item, a contrast setting item, a brightness setting item, a sharpness setting item, and a color density setting item, but the present disclosure is not limited thereto.

The image display apparatus 100 may recognize that items included in the menu screen image 710 may be set by a wheel key input, based on information regarding the menu screen image 710. For example, the image display apparatus 100 may recognize that a cursor may be moved on a slider bar according to a wheel key input, based on information indicating that the menu screen image 710 includes the slider bar and the cursor for adjusting values for respective items.

The image display apparatus 100 may transmit an activation signal to the control device 300 when the image display apparatus 100 may be controlled by a wheel key input.

In response to the activation signal, the control device 300 may transmit a control signal corresponding to a wheel key input sensed by the control device 300 to the image display apparatus 100. At this time, the control signal may include information regarding a rotation direction, the number of rotations, and a rotation angle corresponding to the wheel key input.

The image display apparatus 100 may move a cursor 730 on a slider bar 720 based on a received control signal. For example, when the image display apparatus 100 receives a control signal corresponding to an input that rotates a wheel key clockwise by a first angle, the image display apparatus 100 may move the cursor 730 on the slider bar 720 to the right by a first distance. Alternatively, when the image display apparatus 100 receives a control signal corresponding to an input that rotates the wheel key counterclockwise by a second angle, the image display apparatus 100 may move the cursor 730 on the slider bar 720 to the left by a second distance. At this time, a moving distance of the cursor 730 may be proportional to a rotation angle of the wheel key.

As shown in FIG. 7, in correspondence to a wheel key input, the image display apparatus 100 may set a value corresponding to a point to which the cursor 730 has moved as a set value for a corresponding item and display the set value.

FIG. 8 is a diagram for describing a method by which an image display apparatus controls a 360-degree image, based on a wheel key input, according to an example embodiment.

Referring to FIG. 8, the image display apparatus 100 according to an example embodiment may display a 360-degree image. The 360-degree image may be an image having a 360-degree angle of view. For example, the 360-degree image may be an image generated based on a plurality of images covering all angles in a 360-degree rotation captured by using at least one camera.

The image display apparatus 100 may display an image of an area (an image in a direction 810) in a 360-degree image on a display and display an indicator 820 indicating that a direction or a location of an area of the 360-degree image to be displayed on the display may be controlled. For example, the indicator 820 may include arrows in 4 directions.

The image display apparatus 100 may recognize that a 360-degree image may be controlled by a wheel key input when the image display apparatus 100 enters a 360-degree image mode. For example, the image display apparatus 100 may recognize that a direction and a location of an area of the 360-degree images displayed on the display may be changed by a wheel key input.

The image display apparatus 100 may transmit an activation signal to the control device 300 when the image display apparatus 100 may be controlled by a wheel key input.

In response to an activation signal, the control device 300 may transmit a control signal corresponding to a wheel key input sensed by the control device 300 to the image display apparatus 100. At this time, the control signal may include information regarding a rotation direction, the number of rotations, and a rotation angle corresponding to the wheel key input.

The image display apparatus 100 may change a direction of an image displayed on the display based on a received control signal. For example, when the image display apparatus 100 receives a control signal corresponding to an input that rotates a wheel key clockwise or counterclockwise by a first angle, the image display apparatus 100 may move an area of a 360-degree image displayed on the display in azimuthal directions or an altitude direction by a second angle and display an image corresponding to the moved area on the display. Here, the second angle may be proportional to the first angle, but the present disclosure is not limited thereto.

FIG. 9 is a diagram for describing a method by which an image display apparatus selects an Internet of Things (IoT) device to be controlled, based on a wheel key input, according to an example embodiment.

The image display apparatus 100 according to an example embodiment may control an IoT apparatus existing around the image display apparatus 100 and display an IoT apparatus selecting menu screen image 910 for selecting an IoT apparatus to be controlled.

As shown in FIG. 9, the IoT apparatus selecting menu screen image 910 may include at least one IoT apparatus that may be controlled by the image display apparatus 100. The IoT apparatus may be a general apparatus (or object) applied to an IoT system. For example, the IoT apparatus may include a refrigerator, an air conditioner, a CCTV, a TV, a washing machine, a cleaner, an oven, a dehumidifier, a lamp, a fire alarm, a temperature sensor, a humidity sensor, an acoustic sensor, a motion sensor, a proximity sensor, a gas detecting sensor, and a heat detecting sensor, but the present disclosure is not limited thereto.

Referring to FIG. 9, the IoT apparatus selecting menu screen image 910 may include an object 920 corresponding to a wheel key included in the control device 300 and may display IoT apparatuses around the object 920 in directions in which the corresponding IoT apparatuses are located from the image display apparatus 100.

The image display apparatus 100 according to an example embodiment may recognize that an IoT apparatus selection may be controlled by a wheel key input when entering the IoT apparatus selecting menu screen image 910.

The image display apparatus 100 may transmit an activation signal to the control device 300 when the image display apparatus 100 may be controlled by a wheel key input.

In response to the activation signal, the control device 300 may transmit a control signal corresponding to a wheel key input sensed by the control device 300 to the image display apparatus 100. At this time, the control signal may include information regarding a rotation direction, the number of rotations, and a rotation angle corresponding to the wheel key input.

The image display apparatus 100 may select an IoT apparatus displayed on the display based on a received control signal. For example, when the image display apparatus 100 receives a control signal corresponding to an input that rotates a wheel key in a clockwise or counterclockwise direction by an angle, the image display apparatus 100 may control to select an IoT apparatus located at the corresponding angle. At this time, the image display apparatus 100 may display a direction and an angle for rotating a wheel key on the object 920, thereby allowing a user to easily select the IoT apparatus.

Figure 10:
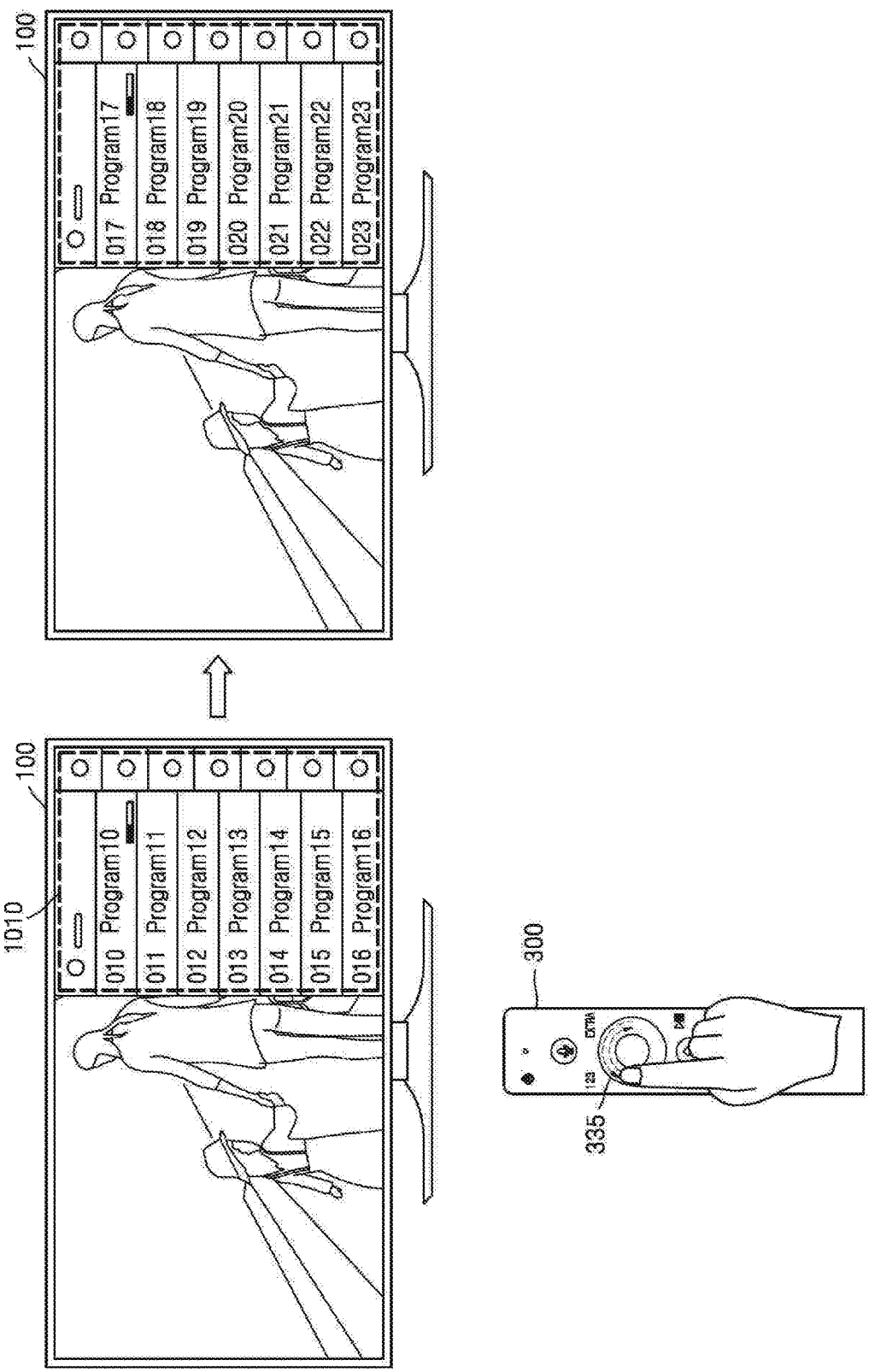
FIG. 10 is a diagram for describing a method by which an image display apparatus performs page up/down operations, based on a wheel key input, according to an example embodiment.

FIG. 10 is a diagram for describing a method by which an image display apparatus performs page up/down operations, based on a wheel key input, according to an example embodiment.

Referring to FIG. 10, the image display apparatus 100 according to an example embodiment may display a list including a plurality of items. For example, as shown in FIG. 10, the list may be a channel list 1010, and the channel list 1010 may include a plurality of channel items. A channel item may include a channel number, a channel name, and a program name being broadcasted on a corresponding channel.

When the number of channel items included in the channel list 1010 is equal to or greater than a pre-set number, the image display apparatus 100 may display only some of the channel items included in the channel list 1010 and control to display the remaining channel items based on an input that scrolls the channel list 1010 in vertical directions or horizontal directions.

When the image display apparatus 100 enters a channel list display mode, the image display apparatus 100 may recognized that page up/down operations regarding the channel list 1010 may be controlled.

The image display apparatus 100 may transmit an activation signal to the control device 300 when the image display apparatus 100 may be controlled by a wheel key input.

The image display apparatus 100 according to an example embodiment may receive a control signal corresponding to a wheel key input regarding the wheel key 335 from the control device 300. At this time, the control signal may include information regarding a rotation direction, the number of rotations, and a rotation angle corresponding to the wheel key input.

The image display apparatus 100 may perform page up/down regarding the channel list 1010 based on the received control signal. For example, when channel items corresponding to channels 10 through 16 are currently displayed in the channel list 1010 and a control signal corresponding to an input that rotates the wheel key 335 clockwise once by 360 degrees is received, the image display apparatus 100 may display channel items corresponding to channels 17 through 23, which are channels next to the channels 10 through 16, in the channel list 1010.

Alternatively, when a control signal corresponding to an input that rotates the wheel key 335 counterclockwise once by 360 degrees is received while the channel items corresponding to the channels 10 through 16 are being displayed in the channel list 1010, the image display apparatus 100 may display channel items corresponding to channels 3 through 9, which are channels before the channels 10 through 16, in the channel list 1010.

Alternatively, when a control signal corresponding to an input that rotates the wheel key 335 clockwise or counterclockwise by an angle, the image display apparatus 100 may scroll the channel list 1010 vertically or horizontally by a distance and display the channel list 1010. However, the present disclosure is not limited thereto.

Figure 11:
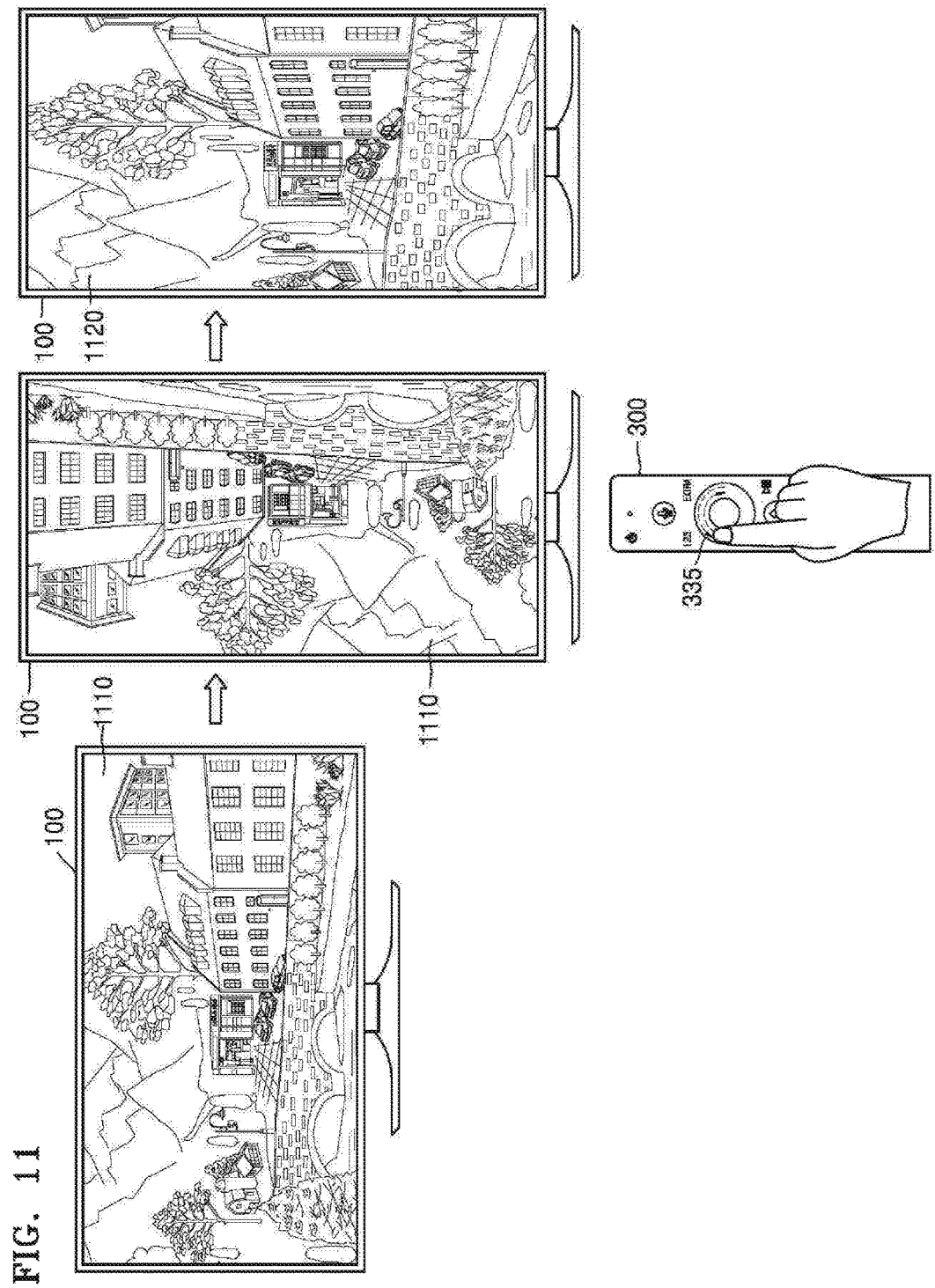
FIG. 11 is a diagram for describing a method by which an image display apparatus rotates an image, based on a wheel key input, according to an example embodiment.

FIG. 11 is a diagram for describing a method by which an image display apparatus rotates an image, based on a wheel key input, according to an example embodiment.

Referring to FIG. 11, the display of the image display apparatus 100 according to an example embodiment may be rotated by 360 degrees. Furthermore, the image display apparatus 100 may detect a rotation of the display by using a gyro sensor or the like.

For example, the image display apparatus 100 may rotate the display counterclockwise by 90 degrees as shown in FIG. 11. The image display apparatus 100 may transmit an activation signal to the control device when a rotation of the display is recognized. Furthermore, the image display apparatus 100 may display a guide message informing to a user that an image being displayed on the display may be rotated by a wheel key input.

The image display apparatus 100 according to an example embodiment may receive a control signal corresponding to a wheel key input from the control device 300. At this time, the control signal may include information regarding a rotation direction, the number of rotations, and a rotation angle corresponding to the wheel key input.

The image display apparatus 100 may rotate an image being displayed on the display based on a received control signal. For example, when the image display apparatus 100 receives a control signal corresponding to an input that rotates a wheel key clockwise by 90 degrees, the image display apparatus 100 may rotate the image being displayed on the display clockwise by 90 degrees. Referring to FIG. 11, the image display apparatus 100 may display a second image 1120, which corresponds to a first image 1110 that was displayed on the display and is rotated clockwise by 90 degrees. At this time, the image display apparatus 100 may adjust an aspect ratio or a resolution of the rotated second image 1120 according to an aspect ratio of the rotated display.

Figure 12:
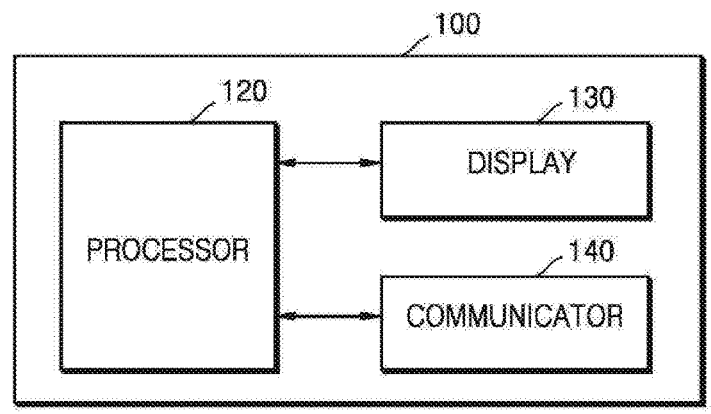
FIG. 12 is a block diagram showing a configuration of an electronic device, according to an example embodiment.

FIG. 12 is a block diagram showing a configuration of an electronic device, according to an example embodiment.

Referring to FIG. 12, the image display apparatus 100 according to an example embodiment may include a processor 120, a display 130, and a communicator 140.

The communicator 140 according to an example embodiment may be a transceiver (transmitter and receiver) or communication interface that communicates, and may include one or more components for performing a communication between the image display apparatus 100 and an external device (e.g., the control device 300). For example, the communicator 140 may transmit an activation signal to the control device 300 and receive a control signal corresponding to a wheel key input from the control device 300, via a short-range communication. In this case, the short-range communication may include Wi-Fi, NFC, Bluetooth, and an infrared-type Zigbee, but are not limited thereto.

The processor 120 according to an example embodiment controls the overall operations of the image display apparatus 100 and signal flows between internal components of the image display apparatus 100 and processes data. The processor 120 may execute an operating system (OS) and various applications stored in a storage when a user input is received or a pre-set condition is satisfied.

The processor 120 according to an example embodiment determines whether the image display apparatus 100 may be controlled by a wheel key input and, when the image display apparatus 100 may be controlled by a wheel key input, may control the communicator 140 to transmit an activation signal to the control device 300. Furthermore, in response to the activation signal, the processor 120 may determine various interactions appropriate to the current situation based on a received control signal and state information regarding a screen image being displayed on the display 130. Furthermore, the processor 120 may control an operation of the image display apparatus 100 according to a determined interaction.

The processor 120 according to an example embodiment may include one or more processors and a memory. For example, the one or more processors may execute one or more programs stored in the memory, and the one or more processors may include a single core, dual cores, triple cores, quad cores, and cores of multiples thereof. Furthermore, the memory may store various data, programs, or applications for driving and controlling the image display apparatus 100. A program stored in the memory may include one or more instructions. Programs (one or more instructions) or applications stored in the memory may be executed by the one or more processors.

The display 130 according to an example embodiment converts a video signal, a data signal, an OSD signal, and a control signal processed by the processor 120 and generates a driving signal. The display 130 may be implemented as a plasma display panel (PDP), a liquid crystal display (LCD), an organic light-emitting display (OLED), and a flexible display and may also be implemented as a 3-dimensional (3D) display. Furthermore, the display 130 may be configured as a touch screen and used as an input device as well as an output device.

The display 130 according to an example embodiment may display a screen image changed according to a determined interaction. However, the present disclosure is not limited thereto.

Figure 13:
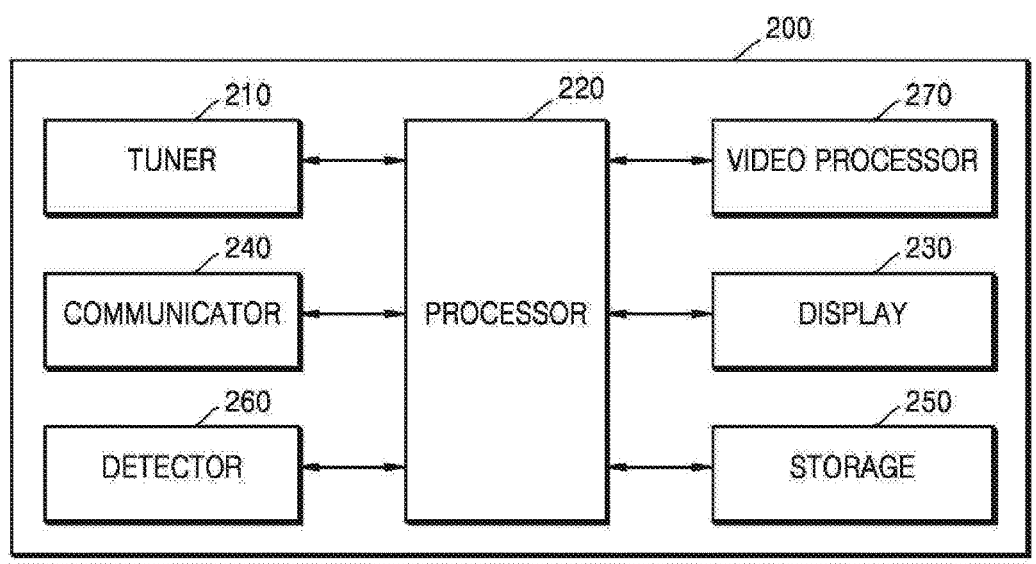
FIG. 13 is a block diagram showing a configuration of an image display apparatus, according to another example embodiment.

FIG. 13 is a block diagram showing a configuration of an image display apparatus, according to another example embodiment. An image display apparatus 200 of FIG. 13 may be a modified example embodiment of the image display apparatus 100 of FIG. 1.

Referring to FIG. 13, the image display apparatus 200 may include a tuner 210, a processor 220, a display 230, a communicator 240, a storage 250, a detector 260, and a video processor 270. The processor 220 of FIG. 13 may correspond to the processor 120 of FIG. 12, the communicator 240 of FIG. 13 may correspond to the communicator 140 of FIG. 11, and the display 230 of FIG. 13 may correspond to the display 130 of FIG. 12. Descriptions identical to those given above with reference to FIG. 12 will be omitted below.

The tuner 210 may receive a broadcasting signal received via a wire or wirelessly and tune and select only the frequency of a channel to be received by the image display apparatus 100 from many radio wave components through amplification, mixing, resonance, or the like. A broadcasting signal includes audio, video, and additional information (e.g., electronic service guide (ESG), electronic program guide (EPG), etc.).

The tuner 210 may receive a broadcasting signal in a frequency band corresponding to a channel number based on a user input (e.g., a control signal received from the control device 300 including a channel number input, a channel up/down input, and a channel input in an EPG screen image).

The tuner 210 may receive broadcasting signals from various sources such as ground wave broadcasts, cable broadcasts, satellite broadcasts, Internet broadcasts, and the like. The tuner 210 may receive a broadcasting signal from a source, such as an analog broadcast or a digital broadcast.

The communicator 240 may transmit and receive data or signals to and from an external device or a server under the control of the processor 220. The processor 220 may transmit and receive content to an external device connected via the communicator 240, download an application from an external device, or perform web browsing. The communicator 240 may transmit and receive data or signals to and from the image display apparatus 200 according to any one or any combination of a wireless local area network (LAN) (e.g., Wi-Fi), Bluetooth, and wired Ethernet in correspondence to the performance and structure of the image display apparatus 200.

The video processor 270 processes video data received by the image display device 200. The video processor 270 may perform various image processing operations with regard to video data, such as decoding, scaling, noise filtering, frame rate conversion, and resolution conversion.

The detector 260 receives an optical signal (including a control signal) from the external control device 300 via an optical window of the bezel of the display 220. The detector 260 may receive an optical signal corresponding to a user input (e.g., a touch, a press, a touch gesture, a voice, or a motion) from the control device 300. The processor 220 may extract a control signal from the received optical signal. Furthermore, the detector 260 detects a voice of a user, an image of the user, or an interaction of the user. The detector 260 according to an example embodiment may include a microphone for receiving a voice uttered by a user. The microphone may transform a received voice into an electric signal and output the electric signal to the processor 220

Furthermore, the detector 260 according to an example embodiment may detect a user input and transmit a detected signal to the processor 220. The detector 260 may detect a user input corresponding to channel up/down, power on/off, channel selection, and display screen setting from the control device 300. Furthermore, the detector 260 according to an example embodiment may detect a wheel key input regarding a wheel key included in the control device 300.

The storage 250 may store various data, programs, or applications for operating and controlling the image display device 200 under the control of the processor 220. The storage 250 may include a broadcast receiving module, a channel control module, a volume control module, a communication control module, a voice recognition module, a motion recognition module, an optical receiving module, a display control module, an audio control module, an external input control module, a power control module, a module for controlling a wirelessly connected external device (e.g., connected via a Bluetooth communication), a voice database (DB), or a motion DB. The modules and the DB of the storage 250 may be embodied in the form of software for controlling the image display device 200 to perform a broadcast reception control function, a channel control function, a volume control function, a communication control function, a voice recognition function, a motion recognition function, an optical reception control function, a display control function, an audio control function, an external input control function, a power control function, or a function for controlling a wirelessly connected external device (e.g., connected via a Bluetooth communication). The processor 220 may perform the above-stated functions by using the software modules stored in the storage 250.

The block diagrams of the image display devices 100 and 200 shown in FIGS. 12 and 13 are block diagrams showing example embodiments. Components shown in FIGS. 12 and 13 may be integrated with one another, may include additional components, or may be omitted according to the specifications of the actual image display devices 100 and 200. In other words, two or more components may be combined into a single component or a single component may be split into two or more components. Furthermore, functions performed by respective components are for describing example embodiments and do not construe the present disclosure.

Figure 14:
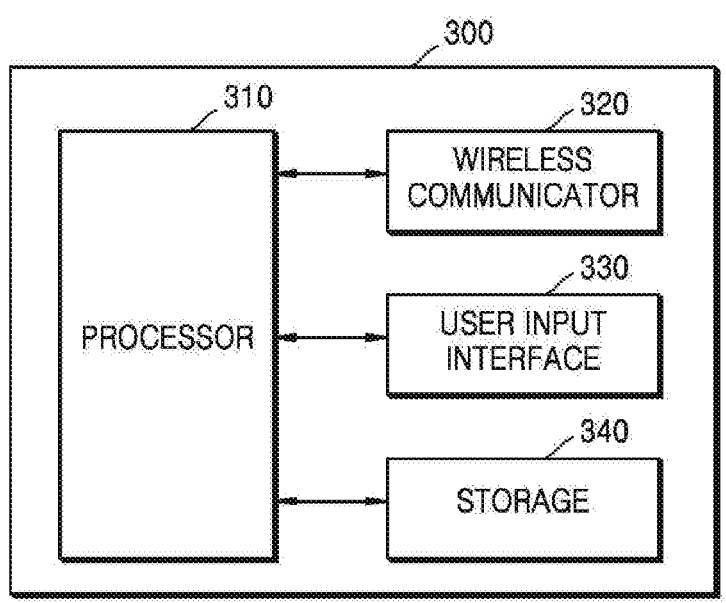
FIG. 14 is a block diagram showing a configuration of a control device, according to an example embodiment.

FIG. 14 is a block diagram showing a configuration of a control device, according to an example embodiment.

Referring to FIG. 14, the control device 300 according to an example embodiment may include a processor 310, a wireless communicator 320, a user input interface 330, and a storage 340.

The wireless communicator 320 may transmit and receive signals to and from any one of the image display apparatuses according to the example embodiments described above. The wireless communicator 320 may receive an activation signal from the image display apparatus 100. The wireless communicator 320 may include an RF module capable of transmitting and receiving signals to and from the image display apparatus 100 according to the RF communication standard. Furthermore, the control device 300 may include an IR module capable of transmitting and receiving signals to and from the image display apparatus 100 according to the IR communication standard. The control device 300 may transmit commands, such as power on/off, channel change, volume change, and the like, to the image display apparatus 100 via the IR module.

The user input interface 330 may include a keypad, a button, a wheel key, a touch pad, or a touch screen. A user may manipulate the user input interface 330 to input commands related to the image display apparatus 100 to the control device 300. When the user input interface 330 includes a hard key button, the user may input a command related to the image display apparatus 100 to the control device 300 through an operation of pressing the hard key button. When the user input interface 330 includes a wheel key, the user input interface 330 may receive an input that rotates the wheel key clockwise or counterclockwise. Furthermore, when the wheel key is implemented as a touch pad, an input that is dragged clockwise or counterclockwise while the wheel key is being touched may be received.

When a wheel key input is detected, the user input interface 330 may sense values regarding a rotation direction, the number of rotations, and a rotation angle corresponding to the wheel key input. The user input interface 330 according to an example embodiment may sense values regarding a rotation direction, the number of rotations, and a rotation angle corresponding to a sensed wheel key input only when an activation signal is received from the image display apparatus 100.

The storage 340 may store various types of programs and application data for controlling or operating the control device 300.

The processor 310 controls various matters related to control of the control device 300. The processor 310 may transmit a signal corresponding to manipulation of a key of the user input interface 330 or a signal corresponding to a motion of the control device 300 to the image display apparatus 100 via the wireless communicator 320. For example, when the processor 310 receives an activation signal from the image display apparatus, the processor 310 may transmit a control signal corresponding to a wheel key input sensed by the user input interface 330 to the image display apparatus 100.

The image display apparatus 100 may identify information regarding an operation of the control device 300 and manipulation of a key of the control device 300 from a signal transmitted from the control device 300 and control the image display apparatus 100 according to the information.

The block diagram of the control device 300 shown in FIG. 14 is a block diagram showing an example embodiment. Components shown in FIG. 14 may be integrated with one another, may include additional components, or may be omitted according to the specifications of the actual control device 300. In other words, two or more components may be combined into a single component or a single component may be split into two or more components. Furthermore, functions performed by respective components are for describing example embodiments and do not construe the present disclosure.

An image display apparatus according to an example embodiment operates to activate a wheel key of a control device only in when the image display apparatus may be controlled by a wheel key input, thereby reducing unnecessary power consumption of the control device.

An image display apparatus according to an example embodiment may receive a control signal corresponding to a wheel key input sensed by a control device only when the image display apparatus may be controlled by a wheel key input, thereby reducing an unnecessary use of a RF bandwidth.

An image display apparatus according to an example embodiment may control an operation by using a wheel key input instead of repetitive inputs of button keys, thereby improving user convenience.

The above-described example embodiments of the present disclosure may be implemented as programmable instructions executable by a variety of computer components and stored in a computer readable recording medium. The computer readable recording medium may include program instructions, a data file, a data structure, or any combination thereof. The program instructions stored in the computer readable recording medium may be designed and configured for the present disclosure or can be publicly known and available to those of ordinary skill in the field of software. Examples of the computer readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, a ROM, a RAM, a flash memory, and the like. Examples of the program instructions include machine codes made by, for example, a compiler, as well as high-level language codes executable by a computer using an interpreter. (The above hardware device can be configured to operate as one or more software modules to perform the operation in an example embodiment, and vice versa.)

It may be understood that example embodiments described herein may be considered in a descriptive sense only and not for purposes of limitation. Descriptions of features or aspects within each example embodiment may be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. An image display apparatus comprising:
a display configured to display a screen;
a communicator configured to communicate with a control device; and
a processor configured to:
determine whether the image display apparatus is in a pr-set state in which the image display apparatus is controllable by a wheel key input, based on state information of the screen displayed on the display;
in response to the image display apparatus being in the pre-set state, control the communicator to transmit an activation signal to the control device;
in response to the activation signal being transmitted, control the communicator to be configured to receive a control signal corresponding to the wheel key input that is sensed by the control device; and
in response to the control signal being received, control an operation of the image display apparatus, according to an interaction that is determined based on the control signal and the state information of the screen.

2. The image display apparatus of claim 1, wherein the processor is further configured to control the display to change the screen, based on the interaction that is determined.

3. The image display apparatus of claim 1, wherein the processor is further configured to determine whether the image display apparatus is in the pre-set state, based on information of a source apparatus connected to the image display apparatus.

4. The image display apparatus of claim 1, wherein the processor is further configured to:
detect depth information of the screen; and
determine whether the image display apparatus is in the pre-set state, based on the depth information.

5. The image display apparatus of claim 1, wherein the processor is further configured to, in response to the screen comprising an object controllable by the wheel key input, determine that the image display apparatus is in the pre-set state.

6. The image display apparatus of claim 1, wherein the control signal comprises information of any one or any combination of a rotation direction, a rotation angle, and a number of rotations of the wheel key input sensed by the control device.

7. The image display apparatus of claim 6, wherein the processor is further configured to determine the interaction, based on the information of any one or any combination of the rotation direction, the rotation angle, and the number of rotations of the wheel key input sensed by the control device.

8. The image display apparatus of claim 7, wherein the processor is further configured to, in response to the screen comprising a video being reproduced by the image display apparatus:
- fast-forward or rewind the video, based on the rotation direction of the wheel key input sensed by the control device; and
- control a speed for fast-forwarding or rewinding the video, based on the rotation angle or the number of rotations of the wheel key input sensed by the control device.

9. The image display apparatus of claim 7, wherein the processor is further configured to, in response to the screen comprising a slider bar allowing a cursor to move on the slider bar, move the cursor on the slider bar in a first direction or a second direction, based on the rotation direction of the wheel key input sensed by the control device.

10. A method of operating an image display apparatus, the method comprising:
- determining whether the image display apparatus is in a pre-set state in which the image display apparatus is controllable by a wheel key input, based on state information of a screen displayed on a display;
- in response to the image display apparatus being in the pre-set state, transmitting an activation signal to a control device;
- in response to the activation signal being transmitted, receiving a control signal corresponding to the wheel key input that is sensed by the control device; and
- in response to the control signal being received, controlling an operation of the image display apparatus, according to an interaction that is determined based on the control signal and the state information of the screen that is displayed on the display.

11. The method of claim 10, wherein the controlling of the operation of the image display apparatus comprises changing the screen, based on the interaction that is determined.

12. The method of claim 10, further comprising determining whether the image display apparatus is in the pre-set state, based on information of a source apparatus connected to the image display apparatus.

13. The method of claim 10, further comprising:
- detecting depth information of the screen; and
- determining whether the image display apparatus is in the pre-set state, based on the depth information.

14. The method of claim 10, further comprising, in response to the screen comprising an object controllable by the wheel key input, determining that the image display apparatus is in the pre-set state.

15. The method of claim 10, wherein the control signal comprises information of any one or any combination of a rotation direction, a rotation angle, and a number of rotations of the wheel key input sensed by the control device.

16. The method of claim 15, further comprising determining the interaction, based on the information of any one or any combination of the rotation direction, the rotation angle, and the number of rotations of the wheel key input sensed by the control device.

17. The method of claim 16, wherein the controlling of the operation of the image display apparatus comprises, in response to the screen comprising a video being reproduced by the image display apparatus:
- fast-forwarding or rewinding the video, based on the rotation direction of the wheel key input sensed by the control device; and
- controlling a speed for fast-forwarding or rewinding the video, based on the rotation angle or the number of rotations of the wheel key input sensed by the control device.

18. A non-transitory computer-readable storage medium storing instructions to cause a processor to:
- determine whether an image display apparatus is in a pre-set state in which the image display apparatus is controllable by a wheel key input, based on state information of a screen displayed on a display;
- in response to the image display apparatus being in the pre-set state, transmit an activation signal to a control device;
- in response to the activation signal being transmitted, receive a control signal corresponding to the wheel key input that is sensed by the control device; and
- in response to the control signal being received, control an operation of the image display apparatus, according to an interaction that is determined based on the control signal that is received and state information of the screen that is displayed on the display.

* * * * *